(12) United States Patent
Durrin (10) Patent No.: US 6,449,801 B1
(45) Date of Patent: Sep. 17, 2002

(54) ADD-ON FRONT WHEEL CASTORS FOR JOGGING STROLLER

(76) Inventor: Greg R. Durrin, 81 Terry La., Selah, WA (US) 98942

( * ) Notice: Subject to any disclaimer, the term of this patent is extended or adjusted under 35 U.S.C. 154(b) by 0 days.

(21) Appl. No.: 09/730,443

(22) Filed: Dec. 4, 2000

(51) Int. Cl.⁷ .............................. B60B 33/00; B60K 1/02
(52) U.S. Cl. .............................. 16/47; 16/29; 16/31 R; 280/62; 280/643
(58) Field of Search .............................. 16/29, 47, 30, 16/31 R; 280/204, 62, 47.38, 47.4, 642, 643

(56) References Cited

U.S. PATENT DOCUMENTS

| | | | |
|---|---|---|---|
| 4,173,810 A | 11/1979 | James ............................ | 16/47 |
| 4,405,142 A * | 9/1983 | Whetstine ...................... | 16/19 |
| 4,759,098 A | 7/1988 | Ko ................................. | 16/29 |
| 5,144,717 A | 9/1992 | Siesholtz et al. .............. | 16/47 |
| 5,232,237 A | 8/1993 | Patrick ........................ | 280/293 |
| 5,265,897 A | 11/1993 | Stephens ..................... | 280/293 |
| 5,267,745 A * | 12/1993 | Robertson et al. ........ | 280/250.1 |
| 5,338,096 A * | 8/1994 | Huang .......................... | 280/30 |
| 5,344,171 A * | 9/1994 | Garforth-Bles ............. | 280/204 |
| 5,408,723 A | 4/1995 | Julien et al. ................... | 16/30 |
| 5,421,597 A * | 6/1995 | Berner ......................... | 280/204 |
| 5,423,561 A * | 6/1995 | Sadow ....................... | 190/18 A |
| 5,669,100 A * | 9/1997 | Carpenter .................. | 16/35 R |
| 5,967,535 A | 10/1999 | King ............................. | 280/47 |
| 5,996,716 A * | 12/1999 | Montiglio et al. ........... | 180/6.5 |
| 6,036,069 A | 3/2000 | Sayegh ........................ | 224/324 |
| 6,193,252 B1 * | 2/2001 | Lin ............................. | 280/204 |

* cited by examiner

*Primary Examiner*—Chuck Y. Mah
(74) *Attorney, Agent, or Firm*—Stratton Ballew PLLC (57) ABSTRACT

A set of add-on front castors or casters, configured for attachment to a conventional three wheeled jogging stroller. The add-on front castor set includes a crossbar with a first crossbar end, a second crossbar end and a mid-crossbar. A first castor mounts proximate the first crossbar end and a second castor mounts proximate the second crossbar end The add-on front castor set also includes a fork clamp that mounts proximate the mid-crossbar. The fork clamp is attachable to a front wheel fork of the jogging stroller. The front wheel fork is configured to accept a hubbed axle of the single forward wheel that is detachable to so that the front wheel fork can receive the fork clamp of the add-on front castor set. The fork clamp of the front castor set is attached to the front fork by first inserting the front fork between a top clamp plate a bottom clamp plate. A clamp screw threads between the top clamp plate and the bottom clamp plate, and a clamp knob is mounted to an end of the clamp screw. By turning the clamp screw, the front fork is compressed between the top clamp plate and the bottom clamp plate to securely mount the fork clamp to the front fork. The add-on castor allows a jogging stroller to function much as a conventional "baby stroller," with swiveling castors for quick changes in the direction of forward or rearward travel.

9 Claims, 10 Drawing Sheets

ADD-ON FRONT WHEEL CASTORS FOR JOGGING STROLLER

TECHNICAL FIELD

The invention provides a front wheel attachment for a three wheeled stroller, and more specifically a method and apparatus for an add-on set of wheel castors or casters, for a jogging stroller.

BACKGROUND OF THE INVENTION

Based upon a simple tricycle, the jogging stroller has become a "must have" for the convenient transportation of small children. The conventional jogging stroller is based upon a triangular or alternatively a "T" shaped frame. The frame has a front fork near the forward point of the frame. A single forward wheel attaches to the front fork, and a pair of rearward wheels attach to the rear of the frame.

The three wheels of the jogging stroller form a stable tripod. Therefore, three wheeled strollers have a significant advantage over their four wheeled, baby stroller and baby carriage predecessors in that a three wheeled configuration is better suited to steer, negotiate bumps and more comfortably carry a passenger. The term "jogging stroller" typically pertains to a subtle variation of a three wheeled push-stroller; suggesting that the person pushing the stroller can safely jog or run while pushing the stroller over varying terrain. The jogging type of three wheeled stroller may include oversized wheels and a hand brake, to better facilitate running and stopping with the stroller.

Many users of jogging strollers seek a stroller that can do more than a single function or be used for more than a single utility or purpose. A multifunctional stroller can provide the economy and convenience of a single stroller while performing various tasks or duties that typically would require additional strollers, each designed for a single, specific purpose.

Jogging type strollers are made for use on relatively straight and wide sidewalks, paths and streets. With their large diameter wheels, maneuvering the jogging stroller in close or confined areas can be difficult. The user must tip the stroller to lift the front wheel of the jogging stroller up and rearward. The user can then pivot the stroller about the rear pair of wheels, while keeping the front tire off the ground. In typically congested areas, such as stores, malls and office buildings, this tipping and pivoting is very awkward and cumbersome, and so results in a significant problem. Therefore, a jogging stroller is needed that solves the problem of limited "close-quarters" maneuvering.

SUMMARY OF INVENTION

The invention provides a method and apparatus for an add-on front castor set uniquely configured for attachment to a jogging stroller of conventional design. The conventional jogging stroller is typified as having a frame with a front wheel fork, which can be simply referred to as a front fork. A single forward wheel attaches to the front fork, and a pair of rearward wheels attach to the rear of the frame.

The add-on front castor set of the present invention includes a crossbar as a primary component. The crossbar has a first crossbar end, a second crossbar end and a mid-crossbar. The mid-crossbar is the portion of the crossbar between the first crossbar end and the second crossbar end. A first castor mounts proximate the first crossbar end and a second castor mounts proximate the second crossbar end.

The add-on front castor set also includes a fork clamp that mounts proximate the mid-crossbar. The fork clamp is attachable to a front wheel fork of the jogging stroller. The front wheel fork is conventionally configured to accept a hubbed axle of the single forward wheel. The single forward wheel is detachable, allowing the front wheel fork to receive the fork clamp of the add-on front castor set.

In a preferred alternative of the present invention, a fork end receiver is mounted proximate the mid-crossbar. The fork end receiver can receive the front fork of the jogging stroller. The front fork of the conventional jogging stroller includes a first fork end and a second fork end. In a preferred embodiment of the present invention, the fork end receiver of the add-on front castor set includes a first fork end receiver and a second fork end receiver. The first fork end is received into the first fork end receiver, and the second fork end is received into the second fork end receiver.

The first castor and the second castor are wheeled assemblies that each include a minimum of a single wheel. Preferably, the first castor includes a first swivel and the second castor includes a second swivel. The swivels allow the castors to respond instantly to directional changes in the motion of the jogging stroller.

The method of the present invention adds the front castor set to a three wheeled jogging stroller. First, the front wheel is removed from the front fork of the jogging stroller. The fork clamp of the front castor set is then attached to the front fork. Additionally, the method of the present invention can include attaching the fork clamp to the front fork by first inserting the front fork between a top clamp plate and a bottom clamp plate. Then a clamp screw is tightened by turning a clamp knob on the fork clamp. The clamp screw threads between the top clamp plate and the bottom clamp plate, and the clamp knob is mounted to an end of the clamp screw. By turning the clamp screw, the front fork is compressed between the top clamp plate and the bottom clamp plate to securely mount the fork clamp to the front fork.

To better seat the front fork into the add-on front castor set, the method of the present invention can include inserting the front fork of the jogging stroller into a fork end receiver. The front fork includes a first fork end and a second fork end, and the fork end receiver is positioned proximate the mid-crossbar of the front castor set. The fork end receiver includes a first fork end receiver and a second fork end receiver. The first fork end is received into the first fork end receiver, and the second fork end is received into the second fork end receiver.

According to one aspect of the invention, the add-on castor set gives the user the ability to quickly and easily modify the jogging stroller for tight cornering in cramped areas without tilting the stroller back to pivot about the rear wheels for turning. Specifically, the stroller configuration of the present invention includes an add-on castor set that allows a jogging stroller to function much as a conventional "baby stroller," with swiveling castors for quick changes in the direction of forward or rearward travel.

According to another aspect of the present invention, the add-on castor set is also easily removed for quick conversion of the modified stroller to the conventional jogging stroller configuration.

The invention will be better understood by reference to the following detailed description taken in conjunction with the accompanying drawings.

DETAILED DESCRIPTION OF SPECIFIC EMBODIMENTS

The present invention provides a method and apparatus for an add-on front castor set that is uniquely configured for attachment to a jogging stroller. FIGS. 1 through 10 show an add-on front castor set 16, also spelled "caster," for fitting to a conventional jogging stroller 15, according to preferred embodiments of the present invention.

Figure 1:
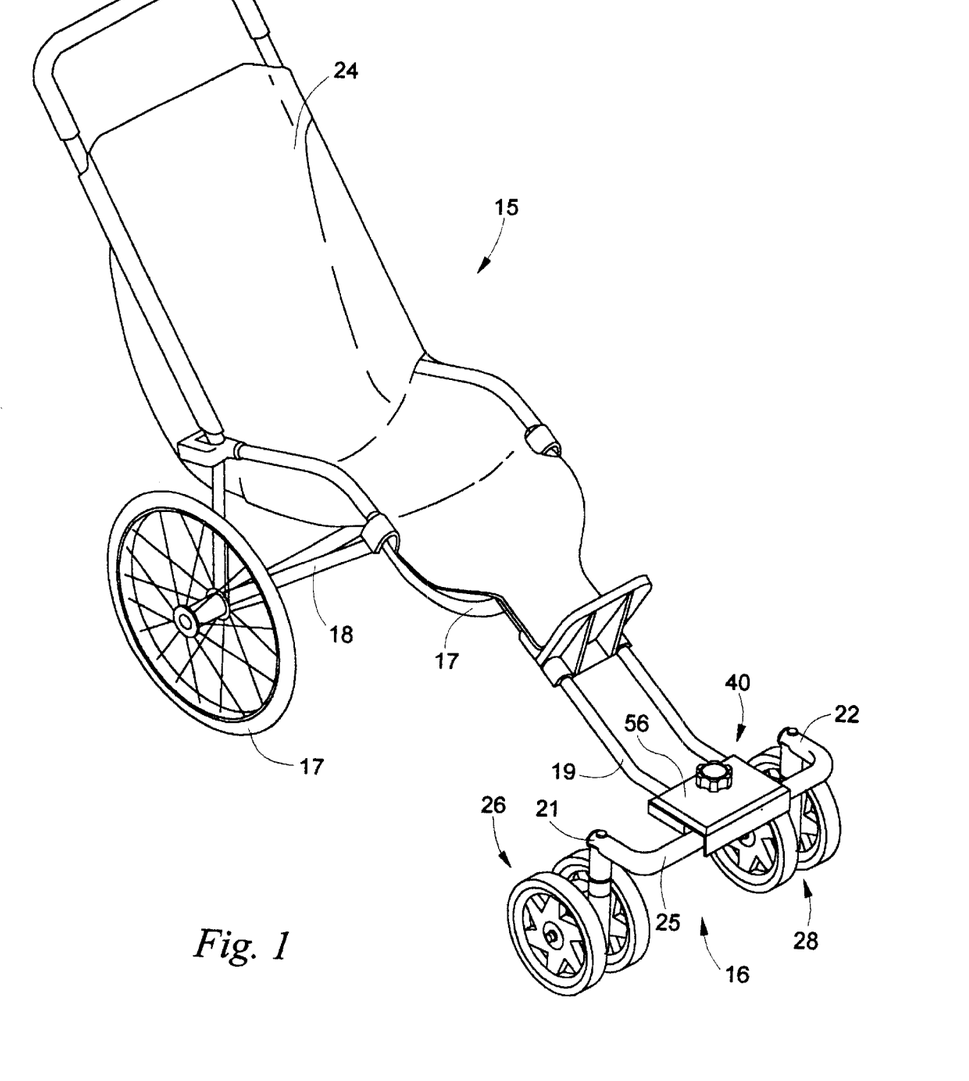
FIG. 1 is a perspective drawing of an add-on front castor set for a jogging stroller, according to an embodiment of the present invention.
Figure 2:
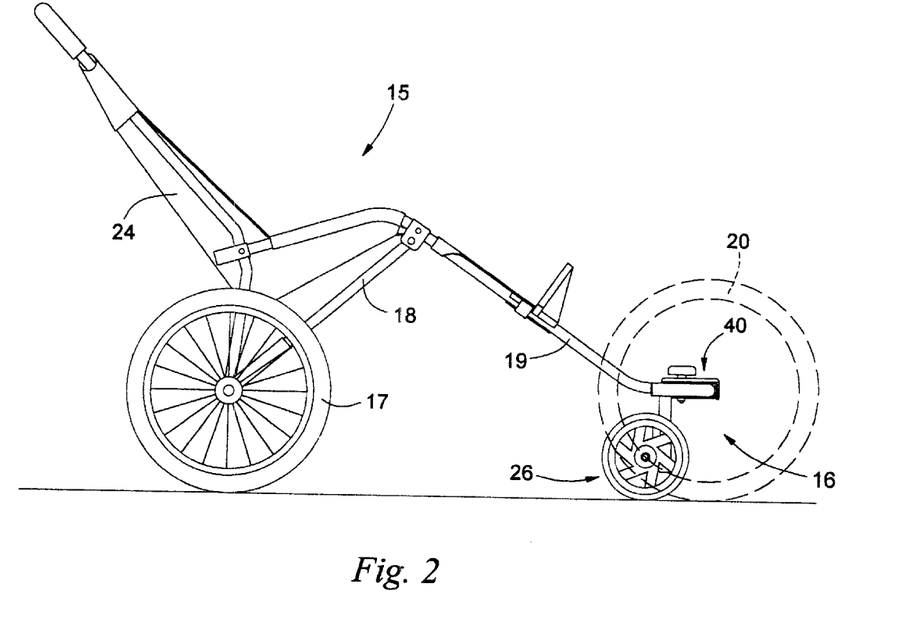
FIG. 2 is a side view of an add-on front castor set for a jogging stroller, according to an embodiment of the present invention.
Figure 3:
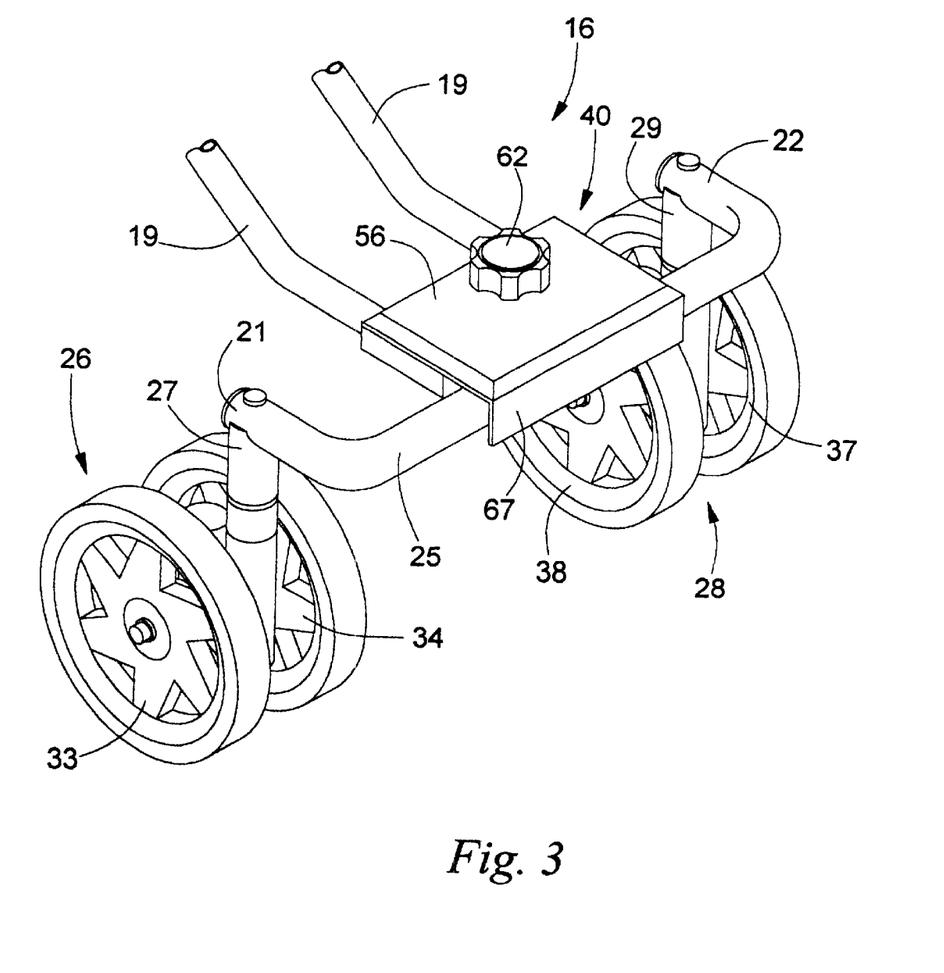
FIG. 3 is a perspective drawing detailing an add-on front castor set, according to an embodiment of the present invention.

As is typical for jogging type strollers, the stroller utilized in the present invention includes a pair of rear wheels 17 mounted to a frame 18 in a parallel, coaxial relationship, as shown in FIGS. 1 and 2. The conventional jogging stroller is based upon a triangular or alternatively a "T" shaped frame. This conventional jogging stroller is additionally typified as having a front wheel fork 19, at the forward end of the frame. A single forward wheel 20 conventionally attaches to the front fork, as shown in dotted outline in FIG. 2, and the pair of rear wheels attaches proximate the rear of the frame. These three wheels form a stable triangular arrangement. The frame is preferably formed to receive a passenger seat 24. Alternatively, the passenger seat may be replaced by a bag, cargo container or an enclosure.

The add-on front castor set 16 of the present invention additionally includes a crossbar 25 as a primary component. The crossbar has a first crossbar end 21, a second crossbar end 22 and a mid-crossbar 23, as detailed in FIGS. 4, 5, 7, 8 and 9. The mid-crossbar is the portion of the crossbar between the first crossbar end and the second crossbar end. The crossbar is preferably a strong and lightweight metal, such as aluminum or steel, and preferably manufactured from a tubular material having a round or a square cross section. Most preferably, the crossbar is fabricated from a round aluminum tubing, such as a 6063, T832 aluminum tubing as manufactured by EASCO of Girard, Ohio, U.S.A., having an approximate wall thickness of 0.058 inches (1.5 mm).

As detailed in FIGS. 3, 4, 5, 9, and 10, a first castor 26 mounts proximate the first crossbar end 21 at a first castor mount 27. A second castor 28 mounts proximate the second crossbar end 22 at a second castor mount 29. Preferably, the first castor mount receives a first swivel 31 for the first castor and the second castor mount receives a second swivel 32 for the second castor mount. The first castor rotates about the first swivel and the second castor rotates about the second swivel. The first and second swivels allow the castors to respond instantly to directional changes in the motion of the jogging stroller.

For the present invention, the first castor 26 and the second castor 28 are wheeled assemblies that each include a minimum of a single wheel. However, a wide variety of swiveling castors are currently known and are employed in devices as exemplified by office chairs, dollies and shopping carts. Although the first castor and the second castor can take a variety of forms, a preferred castor for the present invention includes a two wheeled castor, as detailed in FIGS. 3, 4, 5, 7, 8, 9 and 10. The preferred first castor includes a first castor first wheel 33 and a first castor second wheel 34. The second castor has a second castor first wheel 37 and a second castor second wheel 38. The operation of the castors is conventional in that the first castors and second castors can quickly pivot on their respective swivels, allowing the castor wheels to instantaneously respond to changes in direction of the crossbar 25. Preferably, the wheels of the first castor and the second castor can rotate in any direction of travel, as desired by the person pushing or pulling the jogging stroller 15.

The add-on front castor set 16 of the present invention includes a fork clamp 40 that mounts proximate the mid-crossbar 23. The fork clamp receives and attaches to the front wheel fork 19 of the jogging stroller 15. The front wheel fork is conventionally configured to normally accept a hubbed axle of the single forward wheel 20, or front wheel. When the single forward wheel is detached from the stroller, the front wheel fork is receivable into the fork clamp of the add-on front castor set.

Figure 4:
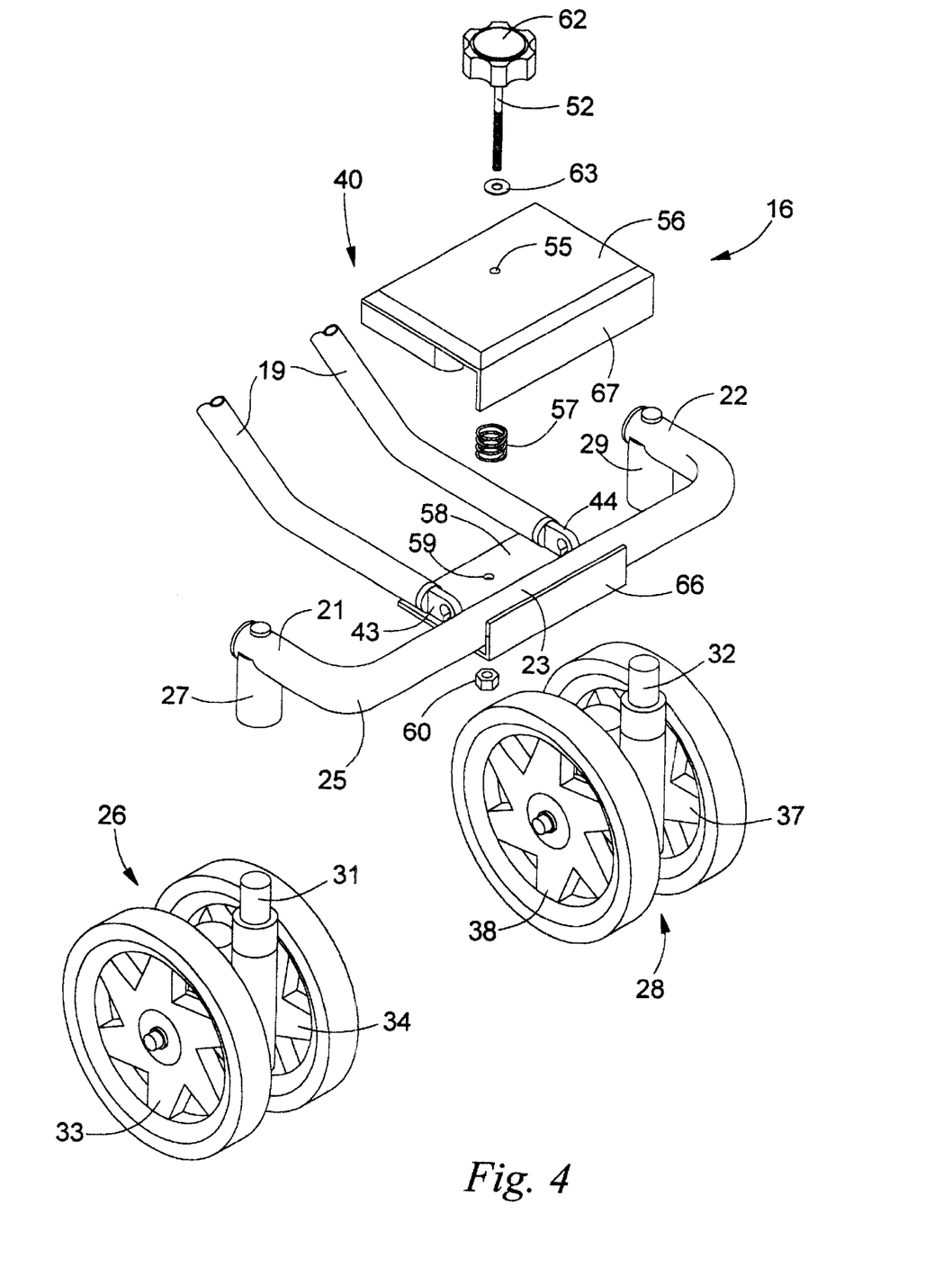
FIG. 4 is a partially exploded perspective drawing detailing an add-on front castor set, according to an embodiment of the present invention.
Figure 5:
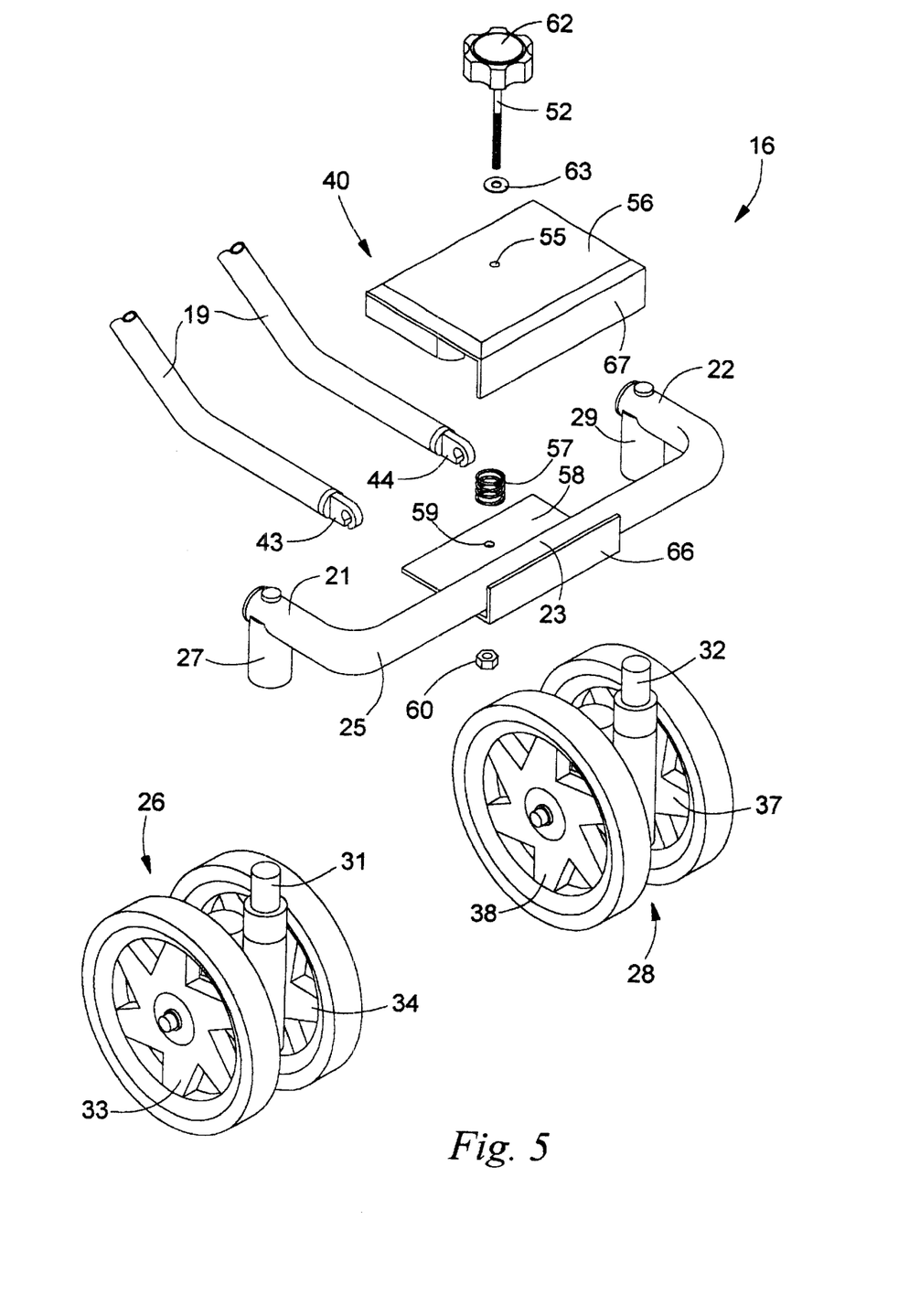
FIG. 5 is a partially exploded perspective drawing detailing an add-on front castor set, according to an embodiment of the present invention.
Figure 8:
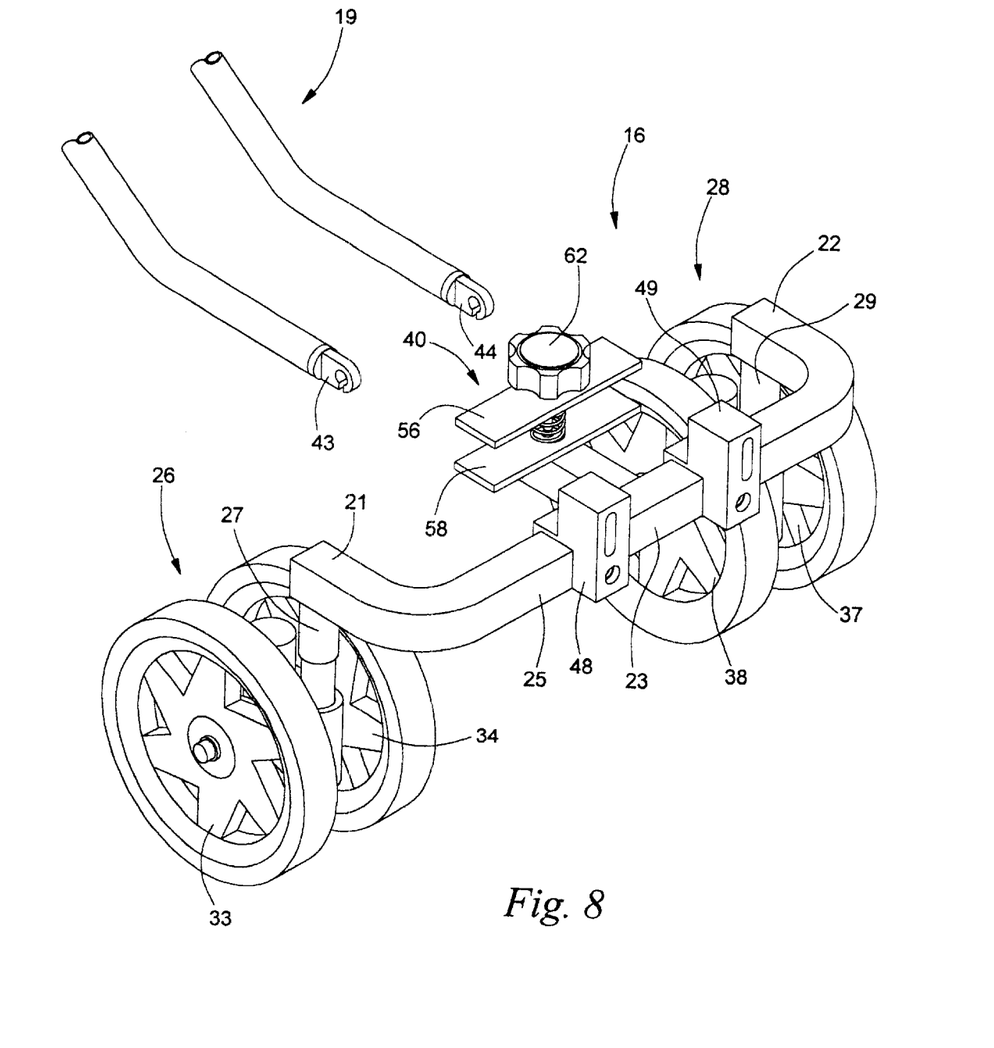
FIG. 8 is a partially exploded perspective drawing detailing an add-on front castor set, according to an embodiment of the present invention.

The common, "quick-release" type of hub system can be employed in combination with the present invention. The quick-release hub allows the user to remove the single forward wheel 20 easily, or interchangeably reattach the single forward wheel after the add-on front castor set 16 is no longer desired or needed. The front wheel fork 19 includes a first fork end 43 and a second fork end 44. As shown in FIG. 4, 5, and 8, the first and second fork ends can be conventional "drop-out" types of fork ends. Drop-outs have an open configuration for use with the quick-release hubs, allowing the easy release of the front wheel, without disassembling the hub and axle components.

Figure 6:
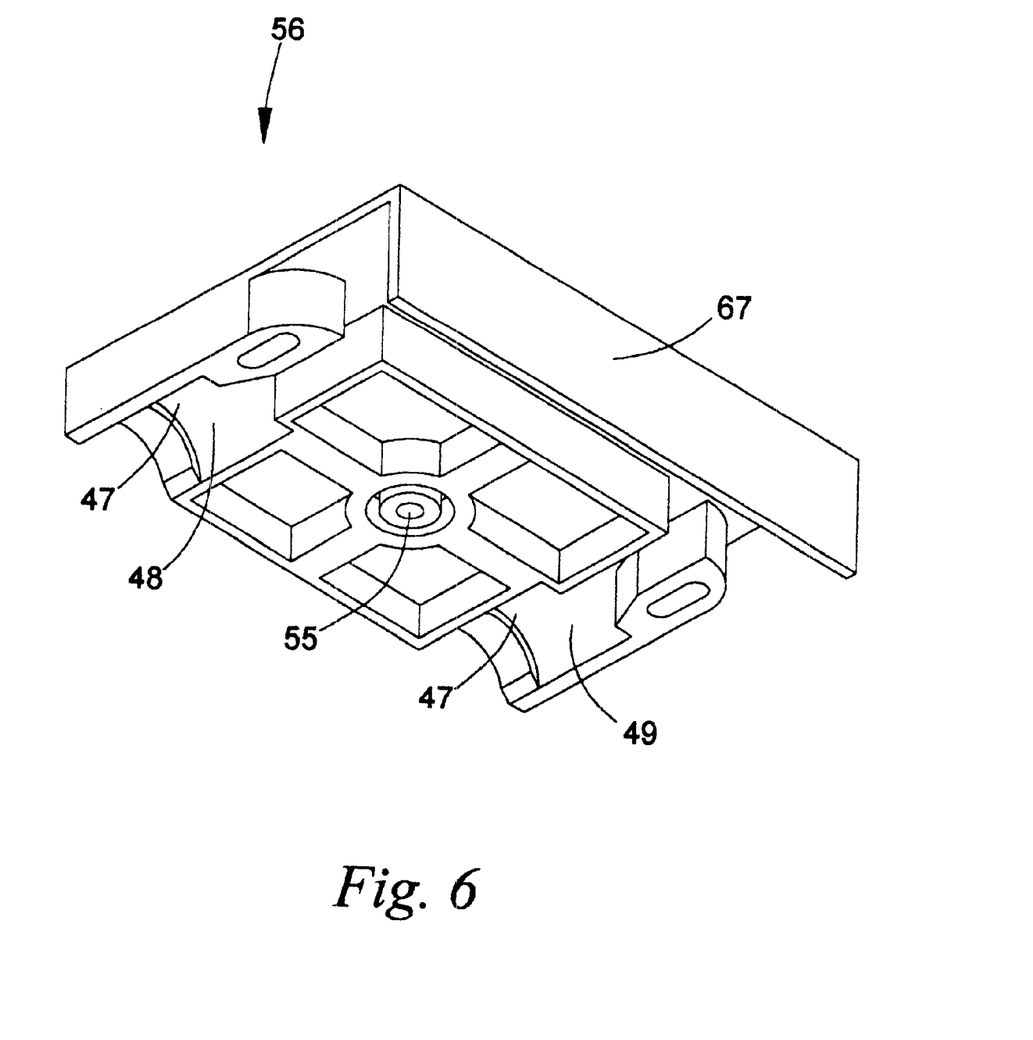
FIG. 6 is a perspective drawing detailing a top clamp plate of an add-on front castor set, according to an embodiment of the present invention.
Figure 7:
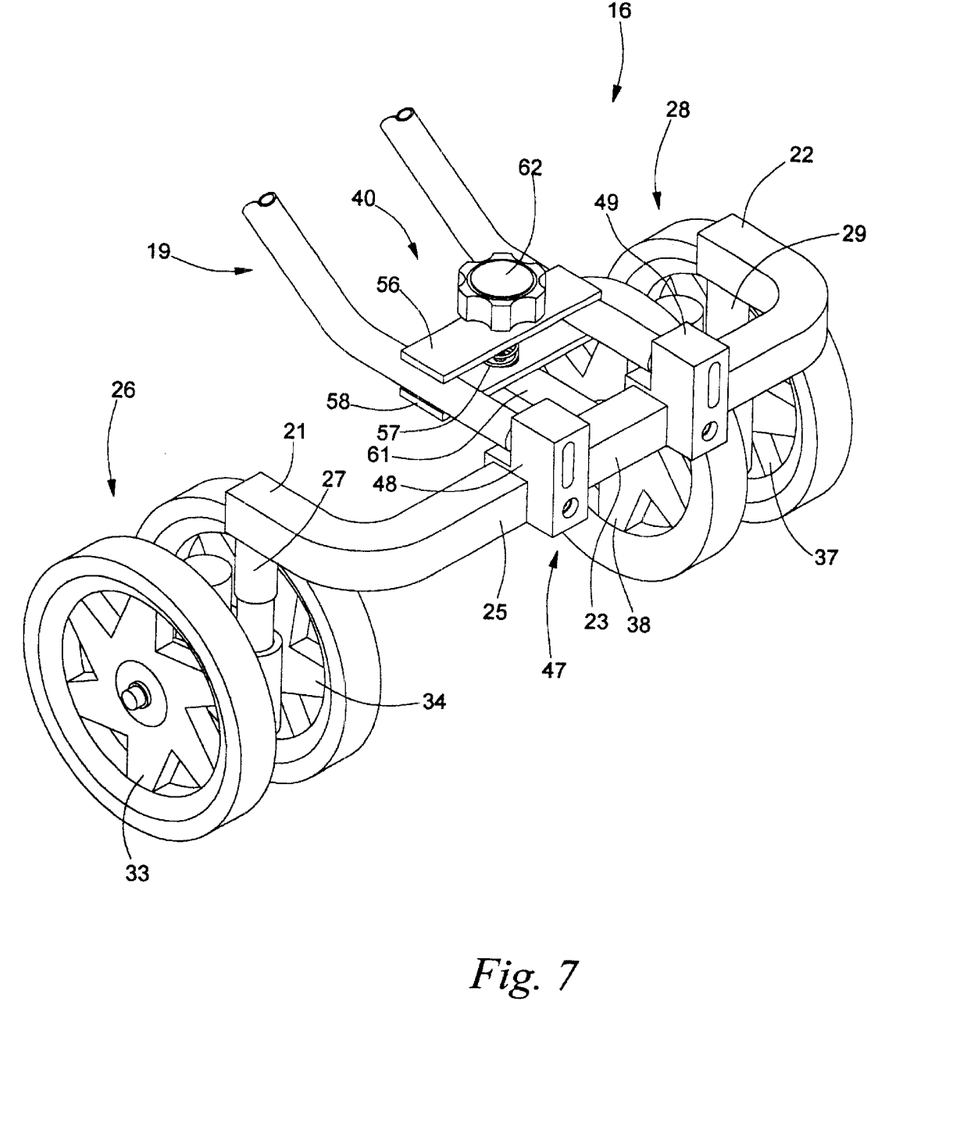
FIG. 7 is a perspective drawing detailing an add-on front castor set, according to an embodiment of the present invention.

In a preferred embodiment of the present invention, as shown in FIG. 6, a fork end receiver 47 is mounted proximate the mid-crossbar 23 of the add-on castor set 16. The fork end receiver, is preferably included in a top clamp plate 56. The fork end receiver accepts the front wheel fork 19 of the jogging stroller 15. In this preferred embodiment of the present invention the first fork end 43 and the second fork end 44 are both received into the fork end receiver. The fork end receiver includes a first fork end receiver 48 and a second fork end receiver 49. The first fork end is received into the first fork end receiver, and the second fork end is received into the second fork end receiver.

The fork clamp 40 attaches to the front wheel fork 19 by the tightening of a clamp screw 52. Preferably, the clamp screw passes through a top clamp screw hole 55 in the top clamp plate 56, a clamp spring 57 and then through a bottom clamp plate 58. The bottom clamp plate is preferably formed from a metal material, such as a medium carbon steel as preferred, or a substantially equivalent metal alloy that exhibits a high tensile strength, and resists bending and deforming. Additionally, the bottom clamp plate can be coated with a plastic polymer or a rubber material to help prevent scratching of the front wheel fork 19.

As detailed in FIGS. 4 and 5, the clamp screw 56 inserts into the top clamp screw hole 55 in the top clamp plate 56, and then is received through a bottom screw clamp hole 59 in the bottom clamp plate 58 and finally threaded into a screw clamp bolt 60, which is preferably affixed to the underside of the bottom clamp plate, by a tack weld, braze or solder.

In a preferred embodiment, the clamp screw is headed by a clamp knob 62. Like the top clamp plate, the clamp knob can be milled from a plastic resin material. As shown in FIGS. 4 and 5, the clamp knob is most preferably separated from the top clamp plate by a clamp screw washer 63. The manual turning of the clamp knob tightens the clamp screw to bring together the top clamp plate and the bottom clamp plate about the received front wheel fork 19.

The top clamp plate 56 and bottom clamp plate 58 are preferably manufactured from plates of a high impact plastic. Injection moldable, cast or alternatively machined plastics that are considered appropriate for manufacturing the top clamp plate include ABS (acrylanitrile butadiene styrene), nylon, PC (polycarbonate) PPO (modified polyphenylene oxide). Many of these materials can be fortified with glass or carbon fibers, or mixed to form alloys having improved properties. Like the top clamp plate, the clamp knob 62 could be milled from a plastic resin material. As an alternative to plastic materials the top clamp plate and the clamp knob could be milled from a small block of metal, preferably a lightweight aluminum, titanium or similar appropriate alloy.

The bottom clamp plate 58 preferably includes a mid-crossbar bottom bracket 66 that extends upward from the leading or froward edge of the bottom clamp plate to abut the crossbar 25 proximate the mid-crossbar 23, as shown in FIGS. 4 and 5. The bottom clamp plate preferably attaches to the mid-crossbar with a tack weld or braze. Alternatively, the bottom clamp plate could be attached to the crossbar with a screw, bolt or rivet. Similarly, the top clamp plate 56, as detailed in FIG. 6, preferably includes a mid-crossbar top bracket 67 that extends downward from the front or leading edge of the top clamp plate. The mid-crossbar top bracket abuts against the mid-crossbar bottom bracket, assembled as shown FIGS. 3, 4 and 5.

As shown in FIGS. 1 through 5, with the first fork end 43 and the second fork end 44 snugly received into the respective first fork end receiver 48 and second fork end receiver 49 within the top clamp plate 56, the tightened down fork clamp 40 prevents movement of the front wheel fork 19, relative to the add-on castor set 16. By loosening the clamp screw 52, the clamp spring 57 expands to assist in the separation of the top clamp plate away form the bottom clamp plate 58, and so achieves the release of the front wheel fork. After the fork clamp is loosened, the front fork is easily removed from the fork end receiver 47 and the single forward wheel 20 can then be replaced onto the front wheel fork.

In an alternative embodiment of the present invention, as shown in FIGS. 7 through 10, instead of including the fork end receiver 47 in the top clamp plate 56, the fork end receiver can be mounted proximate the mid-crossbar 23 of the add-on castor set 16. The fork end receiver accepts the front wheel fork 19 of the jogging stroller 15. In this alternative embodiment, the first fork end 43 and the second fork end 44 are both received into the fork end receiver. The fork end receiver of the add-on front castor set can include the first fork end receiver 48 and the second fork end receiver 49. The first fork end is received into the first fork end receiver, and the second fork end is received into the second fork end receiver. Also, alternatively, the fork end receiver could be incorporated into the bottom clamp plate 58.

The fork clamp 40 attaches to the front wheel fork 19 by the tightening of the clamp screw 52. As detailed in FIG. 9, the clamp screw can pass through the top clamp plate 56, a clamp spring 57 and then through a bottom clamp plate 58. For this alternative embodiment, the top and bottom clamp plates are preferably manufactured from plates of a metallic material, such as a medium carbon steel that exhibits a high tensile strength, to resist bending and deforming. Additionally, similar to the preferred embodiment, the top and bottom clamp plates can be coated with a plastic polymer or a rubber material to prevent scratching of the front wheel fork. For this alternative embodiment, the clamp screw is then threaded into a clamp mount 61, which is an extension of the mid-crossbar 23. The clamp screw is headed by the clamp knob 62. The manual turning of the clamp knob to tighten the clamp screw brings together the top clamp plate and the bottom clamp plate about the received front wheel fork.

Figure 9:
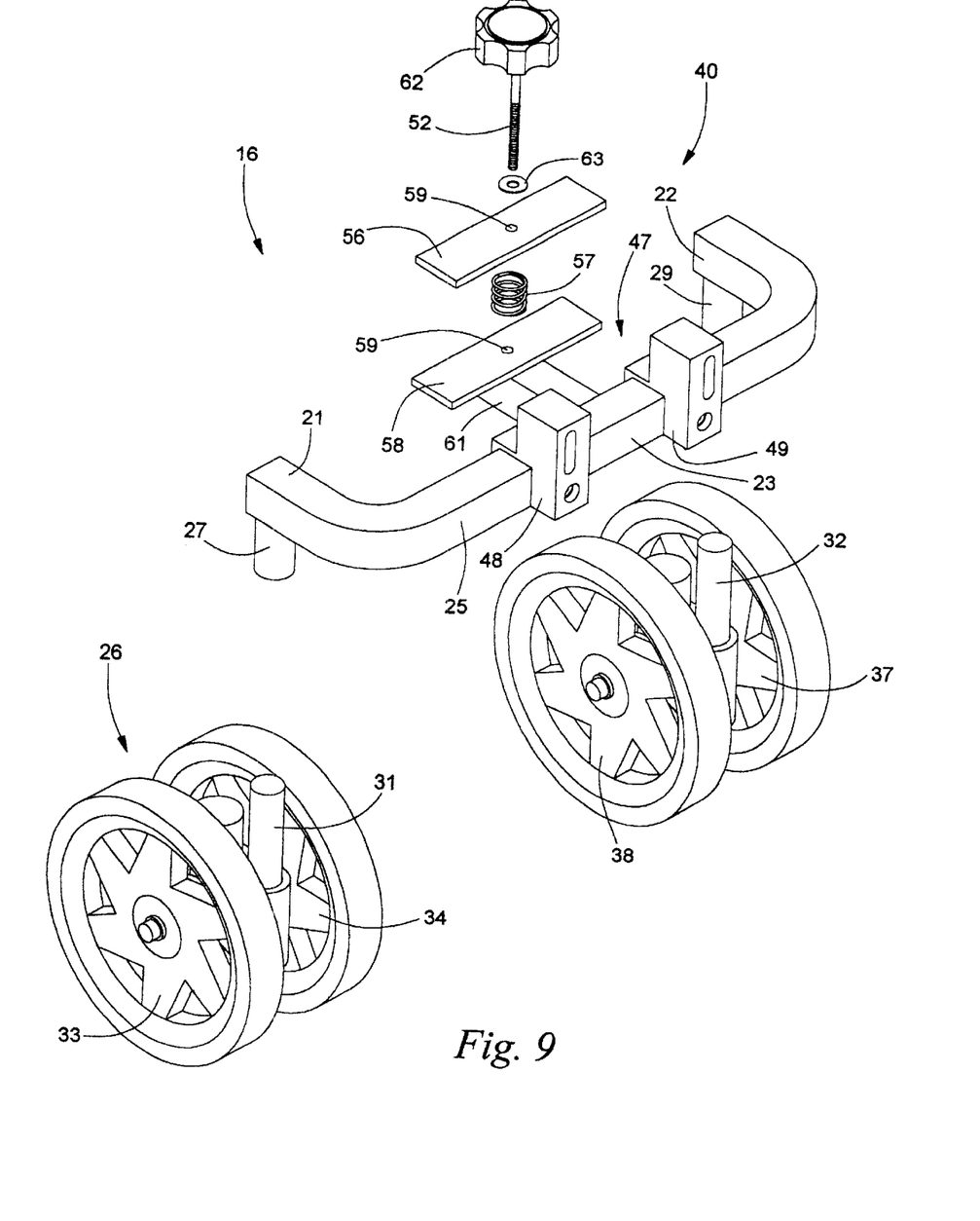
FIG. 9 is a partially exploded perspective drawing detailing an add-on front castor set, according to an embodiment of the present invention.
Figure 10:
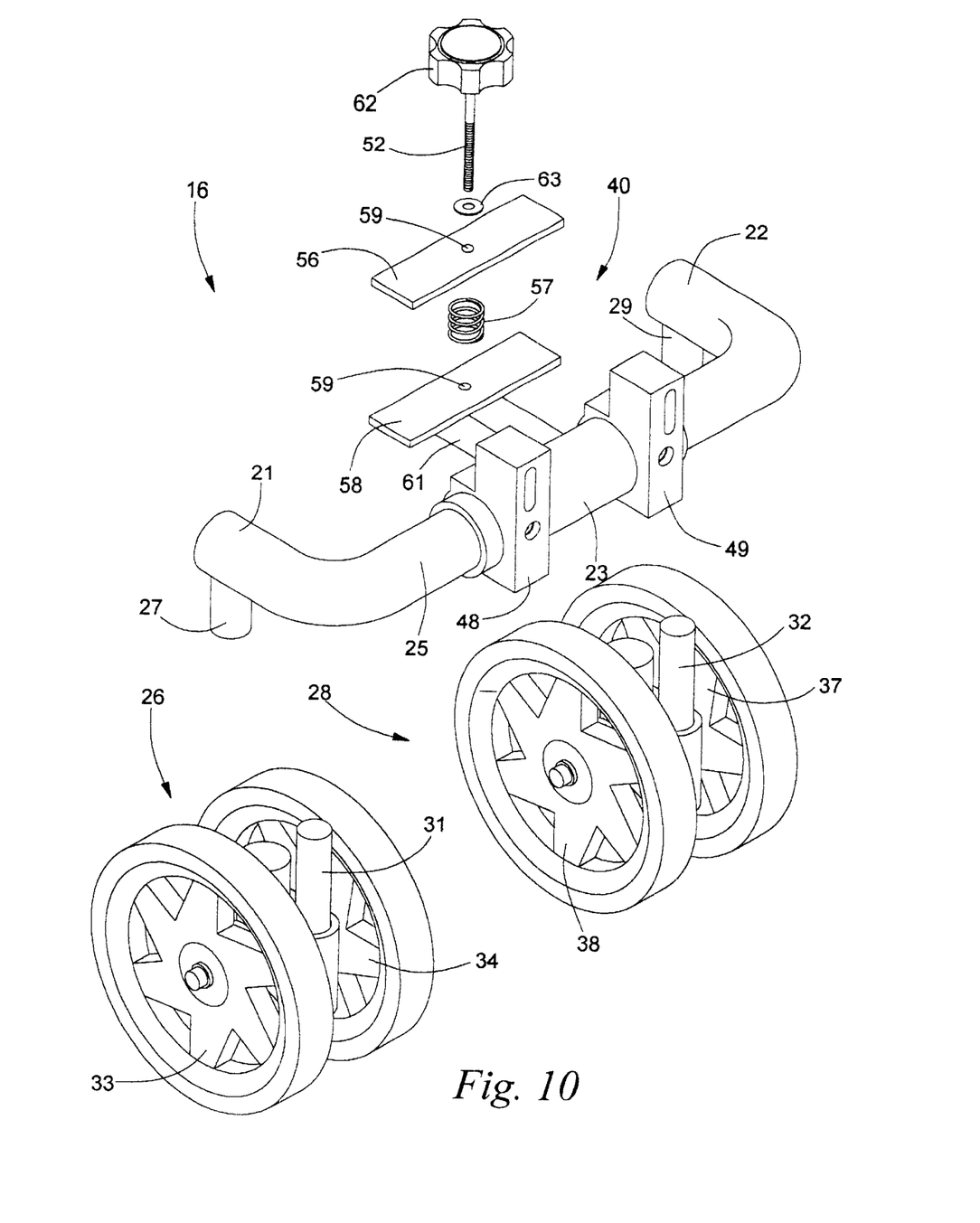
FIG. 10 is a partially exploded perspective drawing detailing an add-on front castor set, according to an embodiment of the present invention.

With the first fork end 43 and the second fork end 44 snugly received into the respective first fork end receiver 48 and second fork end receiver 49, the tightened down fork clamp 40 prevents movement of the front wheel fork 19, relative to the add-on castor set 16. By loosening the clamp screw 52, the clamp spring 57 expands to assist in the separation of the top clamp plate 56 away form the bottom clamp plate 58, and so achieves the release of the front wheel fork. After the fork clamp is loosened, the front fork is easily removed from the fork end receiver 47 and the single forward wheel 20 can then be replaced back onto the front wheel fork.

Similar to the clamp knob, the fork end receiver 47 is preferably milled from a plastic resin material for this alternative embodiment. These components could also be injection molded or cast from a thermoplastic material. Most preferably, as with the preferred alternative, these components are injection molded from a thermosetting plastic as discussed above. Also alternatively, these components could be formed from block of metal, preferably a lightweight aluminum, titanium or similar appropriate alloy.

The method of the present invention installs the add-on front castor set 16 to a three wheeled jogging stroller 15. The method first includes removing the single forward wheel 20, or front wheel, from the front wheel fork 19 of the jogging stroller. As discussed above, the removal of the front wheel is typically an easy operation, considering that most jogging strollers are equipped with quick-release hubs. The conventional purpose for the inclusion of quick-release hubs is they provide for an easy and quick removal of the front wheel, which is desirable for stowing or storing the jogging stroller. However, the wide use of quick-release hubs also aids the ease of replacement of the single forward wheel, with the add-on castor set.

Next, the fork clamp 40 of the add-on castor set 16 is attached to the front wheel fork 19. As also discussed above, the fork clamp mounts on the crossbar 25. This step can also include the insertion of the front fork between the top clamp plate 56 and the bottom clamp plate 58. The clamp screw 52 is then tightened by turning the clamp knob 62. The clamp knob is mounted to clamp screw, preferably at the top end of the clamp screw, and the clamp screw threads between the top clamp plate and the bottom clamp plate. The tightening of the clamp screw compresses the front wheel fork between the top clamp plate and the bottom clamp plate, securely mounting the fork clamp to the front wheel fork.

In an alternative method of the present invention, the step of mounting the fork clamp 40 on the crossbar 25 can also include the additional steps of inserting the front wheel fork 19 of the jogging stroller 15 into the fork end receiver 47, which is near the mid-crossbar 23 of the add-on front castor set 16.

In an additional alternative method of the present invention, the step of inserting the front wheel fork 19 of the jogging stroller 15 into the fork end receiver 47 can additionally include the step of inserting the first fork end 43 and the second fork end 44 into the first fork end receiver and the second fork end receiver, respectively. The first fork end receiver and the second fork end receiver together comprise the fork end receiver.

Substantially the reverse of the above method steps are preformed to remove the add-on castor set 16 from the front wheel fork 19 of the jogging stroller 15. The clamp knob 62 is manually reversed, rotating it in a reverse direction, to untighten the clamp screw 52 and separate the top clamp plate 56 from the bottom clamp plate 58. This action releases the front wheel fork clasped between the top clamp plate and the bottom clamp plate. The clamp spring 57 aids in this release in that as soon as the clamp spring is loosened, and the clamp plates are encouraged to separate due to the tension of the clamp spring. After the top and bottom clamp plates are separated to a sufficient distance, the front wheel fork is removed. If the front wheel fork is also inserted into the fork end receiver 47, as preferred, the front wheel fork is now removed from the fork end receiver to totally separate the front wheel fork from the add-on castor set 16.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited, except by the following claims, as appropriately interpreted in accordance with the doctrine of equivalents.

What is claimed is:

1. An add-on front castor set for a jogging stroller, the front castor set comprising:

a crossbar having a first crossbar end, a second crossbar end and a mid-crossbar;

a first castor mounted proximate the first crossbar end;

a second castor mounted proximate the second crossbar end;

a fork clamp mounted proximate the mid-crossbar, the fork clamp attachable to a front wheel fork of the jogging stroller;

the front wheel fork conventionally configured to accept a hubbed axle of a single forward wheel, and the jogging stroller is a three wheeled stroller having a single forward wheel and a pair of rearward wheels, the single forward wheel detachable from the front wheel fork;

the front wheel fork having a first fork end and a second fork end; and the fork clamp attaches to the front wheel fork proximate the first fork end and the second fork end.

2. An add-on front castor set for a jogging stroller, the front castor set comprising:

a crossbar having a first crossbar end, a second crossbar end and a mid-crossbar;

a first castor mounted proximate the first crossbar end;

second castor mounted proximate the second crossbar end;

a fork clamp mounted proximate the mid-crossbar, the fork clamp attachable to a front wheel fork of the jogging stroller;

a fork end receiver mounted proximate the mid-crossbar for receiving the wheel front fork of the jogging stroller;

the front wheel fork of the jogging stroller including a first fork end and a second fork end;

the fork end receiver of the add-on front castor set includes a first fork end receiver and a second fork end receiver; and the first fork end receivable into the first fork end receiver, and the second fork end receivable into the second fork end receiver.

3. The add-on front castor set of claim 2, wherein:

the fork end receiver has a top clamp plate, and the top clamp plate includes said first fork end receiver and said second fork end receiver.

4. A method for adding a front castor set to a three wheeled jogging stroller, the three wheeled jogging stroller having a front wheel and a pair of rear wheels, the method comprising the steps of:

a) removing the front wheel from a front wheel fork of said jogging stroller; and b) attaching a fork clamp of said front castor set to the front wheel fork, the fork clamp mounted on a crossbar, the crossbar having a first crossbar end, a second crossbar end and a mid-crossbar, a first castor mounted proximate the first crossbar end, a second castor mounted proximate the second crossbar end, and the fork clamp mounted proximate the mid-crossbar.

5. The method of claim 4, wherein the step of attaching the fork clamp to the front wheel fork additionally includes the steps of:

c) inserting the front wheel fork between a top clamp plate a bottom clamp plate;

d) tightening a clamp screw by turning a clamp knob, the clamp screw threaded between the top clamp plate and the bottom clamp plate, and the clamp knob mounted to an end of the clamp screw; and e) compressing the front wheel fork between the top clamp plate and the bottom clamp plate to securely mount the fork clamp to the front wheel fork.

6. The method of claim 4, additionally including the step of:

c) inserting the front wheel fork of the jogging stroller into a fork end receiver.

7. The method of claim 4, additionally including the step of:

c) inserting the front wheel fork of said jogging stroller into a fork end receiver, the front wheel fork having a first fork end and a second fork end, the fork receiver positioned proximate the mid-crossbar of said front castor set, and the fork end receiver of said add-on front castor set including a first fork end receiver and a second fork end receiver; and the first fork end receivable into the first fork end receiver, and the second fork end receivable into the second fork end receiver.

8. An improvement for a conventional jogging stroller, the conventional jogging stroller including a frame having a front fork, the front fork including a first fork end and a second fork end, a single detachable forward wheel attached to the front fork, and a pair of rearward wheels attached to the frame, wherein said improvement comprises:

an add-on front castor set, the add-on front castor set including a crossbar having a first crossbar end, a second crossbar end and a mid-crossbar;

a first castor mounted proximate the first crossbar end;

a second castor mounted proximate the second crossbar end;

a fork clamp mounted proximate the mid-crossbar, the fork clamp attachable to the front fork of the jogging stroller; and a first fork end receiver mounted proximate the mid-crossbar of said add-on front castor, and a second fork end receiver mounted proximate the mid-crossbar of said add-on front castor, the first fork end receivable into the first fork end receiver, and the second fork end receivable into the second fork end receiver.

9. An improvement for a conventional jogging stroller, the conventional jogging stroller including a frame having a front fork, a single detachable forward wheel attached to the front fork, and a pair of rearward wheels attached to the frame, wherein said improvement comprises:

an add-on front castor set, the add-on front castor set including a crossbar having a first crossbar end, a second crossbar end and a mid-crossbar;

a first castor mounted proximate the first crossbar end;

a second castor mounted proximate the second crossbar end;

a fork clamp mounted proximate the mid-crossbar, the fork clamp attachable to the front fork of the jogging stroller;

a fork end receiver mounted proximate the mid-crossbar for receiving the front fork of the jogging stroller; and the fork end receiver includes a top clamp plate.

* * * * *